United States Patent [19]
Jayakumar et al.

[11] Patent Number: 6,012,118
[45] Date of Patent: Jan. 4, 2000

[54] METHOD AND APPARATUS FOR PERFORMING BUS OPERATIONS IN A COMPUTER SYSTEM USING DEFERRED REPLIES RETURNED WITHOUT USING THE ADDRESS BUS

[75] Inventors: Muthurajan Jayakumar, Sunnyvale; Sunny C. Huang, Cupertino, both of Calif.; Peter D. MacWilliams, Aloha, Oreg.; William S. Wu, Cupertino, Calif.; Stephen Pawlowski, Beaverton, Oreg.; Bindi A. Prasad, Los Altos, Calif.

[73] Assignee: Intel Corporation, Santa Clara, Calif.

[21] Appl. No.: 08/954,442

[22] Filed: Oct. 20, 1997

Related U.S. Application Data

[63] Continuation-in-part of application No. 08/774,512, Dec. 30, 1996, abandoned.

[51] Int. Cl.[7] ............................................. G06F 13/42
[52] U.S. Cl. ..................... 710/126; 710/129; 710/107; 710/108; 710/112; 710/36; 710/39
[58] Field of Search ............................... 395/280, 282, 395/285, 292, 309; 711/146; 710/36, 39, 105, 107, 129, 113, 243, 112, 108, 126

[56] References Cited

U.S. PATENT DOCUMENTS

| | | |
|---|---|---|
| 4,181,974 | 1/1980 | Lemay et al. . |
| 4,488,232 | 12/1984 | Swaney et al. . |
| 4,841,436 | 6/1989 | Asano et al. . |
| 5,006,982 | 4/1991 | Ebersole et al. . |
| 5,197,137 | 3/1993 | Kumar et al. . |
| 5,235,684 | 8/1993 | Becker et al. . |
| 5,615,343 | 3/1997 | Sarangdhar et al. ..................... 395/282 |

FOREIGN PATENT DOCUMENTS 0275135   7/1988   European Pat. Off. .

OTHER PUBLICATIONS

European Search Report for Application No. EP94305316, 2 pages (Dec. 14, 1994).

Val Popescu et al., "The Metaflow Architecture," Metaflow Technologies, Inc., IEEE Micro, pp. 10–13 and 63–73 (Jun. 1991).

*Primary Examiner*—Ayaz R. Sheikh
*Assistant Examiner*—Rupal D. Dharia
*Attorney, Agent, or Firm*—Blakely, Sokoloff, Taylor & Zafman LLP

[57] ABSTRACT

A split transaction bus in a computer system that permits out-of-order replies in a pipelined manner using an additional bus for use in the response phase.

39 Claims, 6 Drawing Sheets

METHOD AND APPARATUS FOR PERFORMING BUS OPERATIONS IN A COMPUTER SYSTEM USING DEFERRED REPLIES RETURNED WITHOUT USING THE ADDRESS BUS

This is a continuation-in-part of application Ser. No. 08/774,512, filed Dec. 30, 1996, now abandoned.

FIELD OF THE INVENTION

The invention relates to the field of protocols for computer system buses; particularly, the present invention relates to protocols for buses that perform deferred/out-of-order transactions.

BACKGROUND OF THE INVENTION

In a computer system, transfers between devices such as processors, memories, input/output (I/O) units and other peripherals generally occur according to a protocol. These devices are commonly referred to as agents. The protocol is a method of handshaking that occurs between the devices during a transfer which allows each device involved in the transfer to know how the other device is going to act or perform.

Typically, transfers of data and information in a computer system are performed using multiple buses. These buses may be dedicated buses between only two devices or non-dedicated buses that are used by a number of units, bus agents or devices. Moreover, buses in the system may be dedicated to transferring a specific type of information. For instance, an address bus is used to transfer addresses, while a data bus is used to transfer data.

A bus transaction normally includes a requesting device, or agent, requesting data or a completion signal from another agent on the bus. The request usually includes some number of control signals indicating the type of request accompanied by the address of the desired data or the desired device. The device which is mapped into the address space containing the requested address responds by sending a completion signal along with any data as necessary or after accepting the data.

In some computer systems, bus transactions occur in a pipelined manner. When bus transactions are pipelined, the requests from numerous bus agents are pending at the same time. This is possible due to the fact that separate data and address buses are used. In a pipelined transaction, while an address of a request is being sent on the address bus, the data or signals corresponding to a previously requested address (on the address bus) may be returned on the data bus. In certain pipelined systems, the completion responses occur in the same order as they were requested. However, in other pipelined systems, the order of the completion responses does not have to occur in the same order as their corresponding requests. This type of bus system is commonly referred to as a split transaction bus system.

In split transaction buses, a request is initiated with a first bus transaction to one of the agents in the computer system. If the responding agent cannot provide the response to the request at this time, the response corresponding to the request may be disassociated from the request. Eventually, when the response is ready, the response with optional data is returned to the requesting agent. The requests may be tagged so that they may be identified by the requesting agent upon their return.

To accommodate split transactions, the systems require some capability of associating a response with its address (i.e., its request). One approach is to use two separate token buses and a deferred bus. When performing a request, an address is driven onto the address bus. At the same time, a token is driven on the first token bus. This token is associated with the address request. The token is received by the agent which is to respond to the address request (i.e., the responding agent). When the agent is able to respond, the responding agent drives the token on the second token bus and the appropriate response on the data bus.

Using two token buses increases the number of pins that are required to interface with the external bus. For tokens that are 8-bits in size, using two separate token buses requires an additional sixteen pins to be added to the computer system, as well as additional space allocated on the computer board for the token buses. Moreover, the pins used to support the token buses must also be added to every bus agent package in the system. An increase in the number of pins often equates to an increase in the cost of the package. Thus, the cost of integrated circuit components in the system increases. On the other hand, the increase in bandwidth due to permitting split transactions is significant due to the ability to reorder long latency transactions behind short latency transactions issued later. It is desirable to support split bus transactions without incurring all of the increased cost of modifying integrated circuit components and the increased number of pins required.

Another approach to accommodate split transactions is to use the address and data bus to pass tokens instead of two token buses. Such an approach is described in U.S. Pat. No. 5,568,620, where a token is sent on the data bus while the address is sent on the address bus during a bus request. The responding agent drives the token onto the address bus when generating the appropriate response. Another approach is to send the token on the address bus following an address, instead of using the address bus. Thereafter, the token returns on the address bus during the response. Thus, there are approaches that do not use additional token buses.

A bus is measured by its latency, bandwidth, and scalability. In a design, tradeoffs are made among these parameters, typically at the expense of one or more of the others. Split transactions affect the latency. For instance, an additional number of cycles (e.g., 6–8) need be taken when returning data for a split transaction. If a particular device already has a long latency, the overall latency of the system is even worse. If the latency is performance critical, performance degrades as use of split transactions increases in frequency. What is needed is a system that reduces the latency of the system so that a system using split cycles frequently is not penalized.

One problem associated with the approaches to split transactions without the use of token buses is that the address bus is used twice. The processor uses the address bus when it issues a bus cycle in the system and if the cycle is split. The address bus is used again by the system to return the token when the system returns the reply for the split cycle. Therefore, the more split cycles are being used, the more address bus bandwidth is dissipated. Needing more bandwidth may be disadvantageous in that the address bus may have to be operated at a higher speed, thereby making it difficult to be electrically functional in a common clock scheme.

Another problem with dissipating more address bus bandwidth is that it directly results in loss of scalability for a given frequency. For example, if a bus is designed to support four processors and if the split cycles use up address bandwidth, then the bus may only be able to support two processors.

The present invention provides a method and apparatus for implementing a bus protocol that accommodates split transactions. The bus protocol of the present invention improves the latency, bandwidth and scalability and avoids the problems discussed above.

SUMMARY OF THE INVENTION

A computer system that accommodates split bus transactions is described. The computer system of the present invention comprises a bus, a requesting agent and a responding agent. The bus includes a response bus and a data bus. The requesting agent is coupled to the bus and generates a bus operation. The responding agent is coupled to the bus and provides a deferral response onto the response bus if not ready to complete the bus operation and thereafter provides an out-of-order deferred reply when ready to complete the bus operation. The addition of one separate token bus improves concurrency and latency, as well as maximum bandwidth obtainable.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

A method and apparatus for accommodating split transactions in a computer system is described. In the following detailed description of the present invention numerous specific details are set forth, such as token size, queue size, etc., in order to provide a thorough understanding of the present invention. However, it will be apparent to one skilled in the art that the present invention may be practiced without these specific details. In other instances well known methods, functions, components and procedures have not been described in detail to avoid obscuring the present invention.
Overview of the Present Invention The present invention provides a bus architecture that supports split transactions with improved latency, bandwidth and scalability. The present invention provides a zero latency reply for a split transaction.

The present invention allows split transactions for both memory and I/O operations. In one embodiment, only read responses are deferred, while write operations occur in order. The present invention only needs to arbitrate for use of the data bus when the data associated with the read is ready. Once the use of the data bus has been granted, the reply is sent with request identification (token) on the ID bus to identify the request corresponding to the data on the data bus. The reply has zero latency because it does not require use of the address bus. Instead, the present invention uses a separate token, or ID, bus and a separate response phase for the zero latency reply in a split cycle. In one embodiment, the token comprises a deferred identifier (ID).

Two pins may be included for the new response group for split transactions. The two pins may be used to signal a deferred response, to an agent, that is being sent on the token bus and the data bus. The addition of the two pins allows the present invention to provide 300 Mbytes/sec bandwidth.

The present invention reduces the latency to zero cycles. Because of this reduction, a system is able to use split cycles more frequently without further being penalized. Also the present invention does not need the address bus to be used to transfer deferred replies, which results in a 50% savings in address bandwidth. Because of the reduction in address bandwidth, the speed demand on the address bus is also reduced, thereby reducing the risk in a common clock address bus scheme. Furthermore, since 50% of the address bandwidth is saved, as systems use have increased use of split cycles, there will be more scalability. Thus, the invention improves latency, bandwidth, scalability, and boosts the overall system performance.

The present invention is particularly advantageous to symmetric multi-processing which employs a distributed memory architecture. In one embodiment of the distributed memory architecture, all the memory cycles are split. The use of the present invention adds zero latency to these memory cycles, which enhances performance.
Bus Transactions in the Present Invention In the present invention, devices and units in the computer system perform bus transactions on the processor-memory bus. In one embodiment, the address bus and portions of the control bus of the processor-memory bus together function as a "request" bus for initiating and responding to requests. This "request" bus is used by the initiator of a request (e.g., a requesting agent) to transfer the request type and address and same bus is used by observers (e.g., responding agents) of the request to transfer their status or response for the issued transaction. The data bus transfers data being read or written. In another embodiment, the data bus is also used to transfer request identification information (e.g., a token).

In one embodiment, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions. A transaction is the set of bus activities related to a single request, from request bus arbitration through response-initiated data transfers on the data bus.

A transaction contains up to six phases. However, certain phases are optional based on the transaction and response type. A phase uses a particular signal group to communicate a particular type of information. In one embodiment, the six phases are:

Arbitration

Request

Error

Snoop

Response

Data

The data phase is optional and used if a transaction transfers data on the data bus. The data phases are request-initiated, if the data is available at the time of initiating the request (e.g., for a write transaction), and response-initiated, if the data is not available at the time of generating the transaction response (e.g., for a read transaction).

Figure 1:
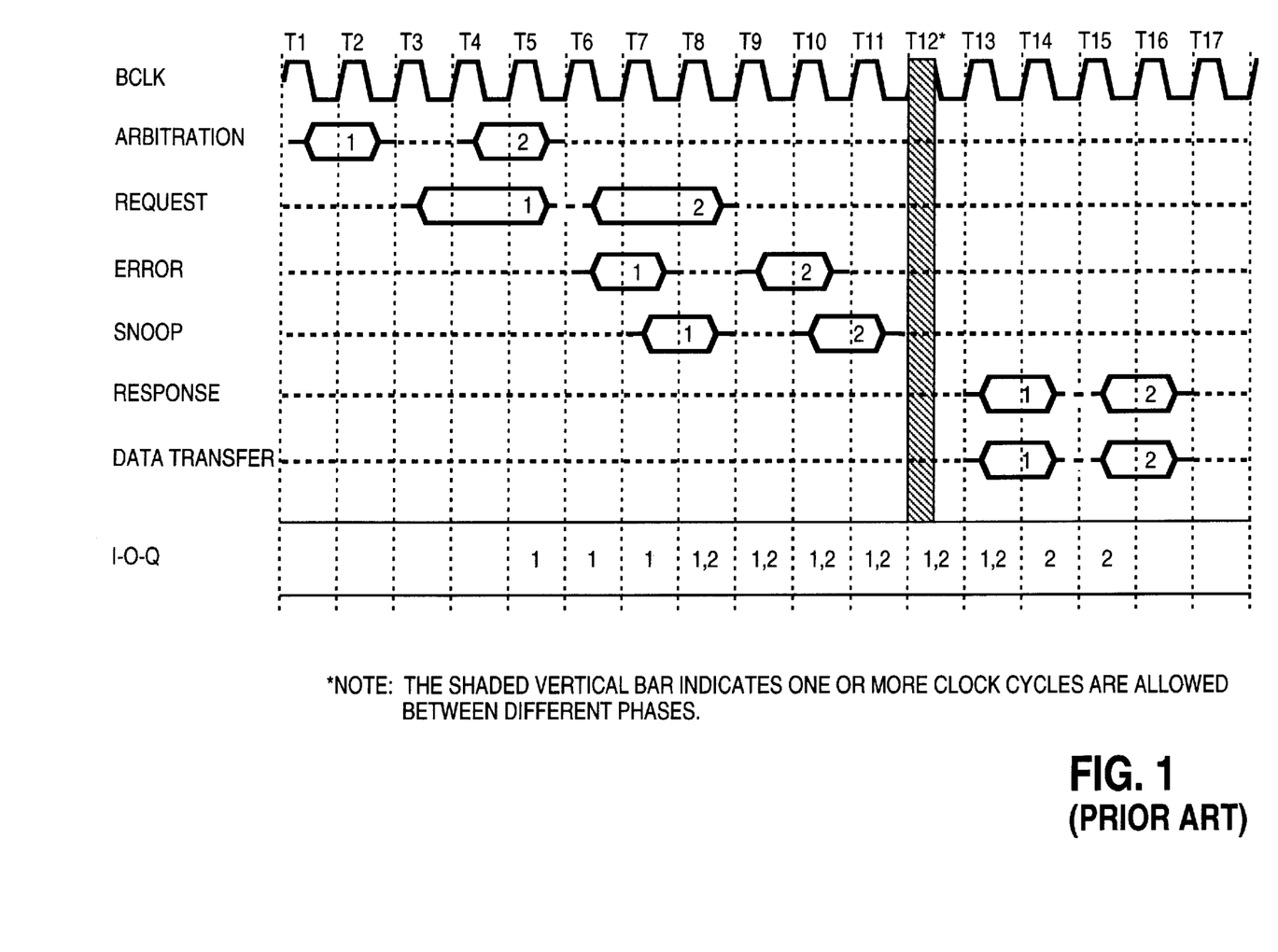
FIG. 1 is a timing diagram of a bus transaction in the currently preferred embodiment.

Different phases from different transactions can overlap, thereby pipelining bus usage and improving bus performance. FIG. 1 is a timing diagram illustrating transaction phases for two transactions with data transfers. Referring to FIG. 1, when the requesting agent does not own the bus, transactions begin with an Arbitration Phase in which a requesting agent becomes the bus owner. However, in the present invention, when performing an out-of-order deferred reply, a responding agent may arbitrate for use of only the data bus without undergoing the arbitration phase which grants control of the entire bus (address, data, control buses). Thus, in the present invention, such a responding agent is allowed to proceed out-of-order with respect to the pipelined order on the address bus.

After the requesting agent becomes the bus owner, the transaction enters the Request Phase, in which the bus owner drives a request, and address information on the bus. The Request Phase is two clocks in duration. In the first clock, the ADS# signal is driven along with the transaction address and sufficient information to begin snooping and memory access. In the second clock, information used to identify the request (e.g., a token) and information about the length of the transaction are driven, along with other transaction information. In an alternate embodiment, the Request Phase is only one clock in duration and the request identification information is driven onto the data bus during the same clock as the ADS# signal is driven with the transaction address.

After the Request Phase, a new transaction enters a first-in-first-out (FIFO) queue, the In-Order queue. All bus agents, including the requesting agent, maintain an In-Order queue and add each new request to those queues. For more information on the in-order queue, see U.S. patent application Ser. No. 08/206,382 entitled "Highly Pipelined Bus Architecture", filed Mar. 1, 1994, assigned to the corporate assignee of the present invention and incorporated herein by reference. In FIG. 1, for example, request 1 is driven in T3, observed in T4, and in the In-Order beginning in T5.

The third phase of every transaction is an Error Phase, three clock cycles after the Request Phase. The Error Phase indicates any immediate (parity) errors triggered by the request.

If the transaction isn't canceled due to an error indicated in the Error Phase, a Snoop Phase is entered, four or more cycles from the Request Phase. The results of the Snoop Phase indicate if the address driven for a transaction references a valid or modified (dirty) cache line in any bus agent's cache. The Snoop Phase results also indicate whether a transaction will be completed in-order or may be deferred for possible out-of-order completion.

Transactions proceed through the In-Order Queue in FIFO order. The topmost transaction in the In-Order Queue enters the Response Phase. The Response Phase indicates whether the transaction has failed or succeeded, whether the transaction completion is immediate or deferred, whether the transaction will be retried and whether the transaction includes a Data Phase.

The valid transaction responses are: normal completion, hard failure, deferred, and retry.

If the transaction does not have a Data Phase, the transaction is complete after the Response Phase. If the request agent has write data to transfer, or is requesting read data, the transaction has a Data Phase which may extend beyond the Response Phase.

In one embodiment, not all transactions contain all phases, not all phases occur in order, and some phases can be overlapped. All transactions that are not canceled in the Error phase have the Request, Error, Snoop, and Response Phases. Also, arbitration may be explicit or implicit in that the Arbitration Phase only needs to occur if the agent that is driving the next transaction does not already own the bus. The Data Phase only occurs if a transaction requires a data transfer. The Data Phase can be absent, response-initiated, request-initiated, snoop-initiated, or request- and snoop-initiated. The Response Phase overlaps the beginning of the Data Phase for read transactions (request-initiated data transfers or snoop-initiated data transfers). The Request Phase triggers the Data Phase for write transactions (request-initiated data transfers).

However, it should be noted that in the present invention the deferred reply is a separate bus transaction that is allowed to avoid the arbitration (of the address bus), request, error and snoop phases, proceeding directly to the response phase on read transactions, only arbitrating for use of the data bus to the send data.

Overview of the Computer System of the Present Invention

Figure 2:
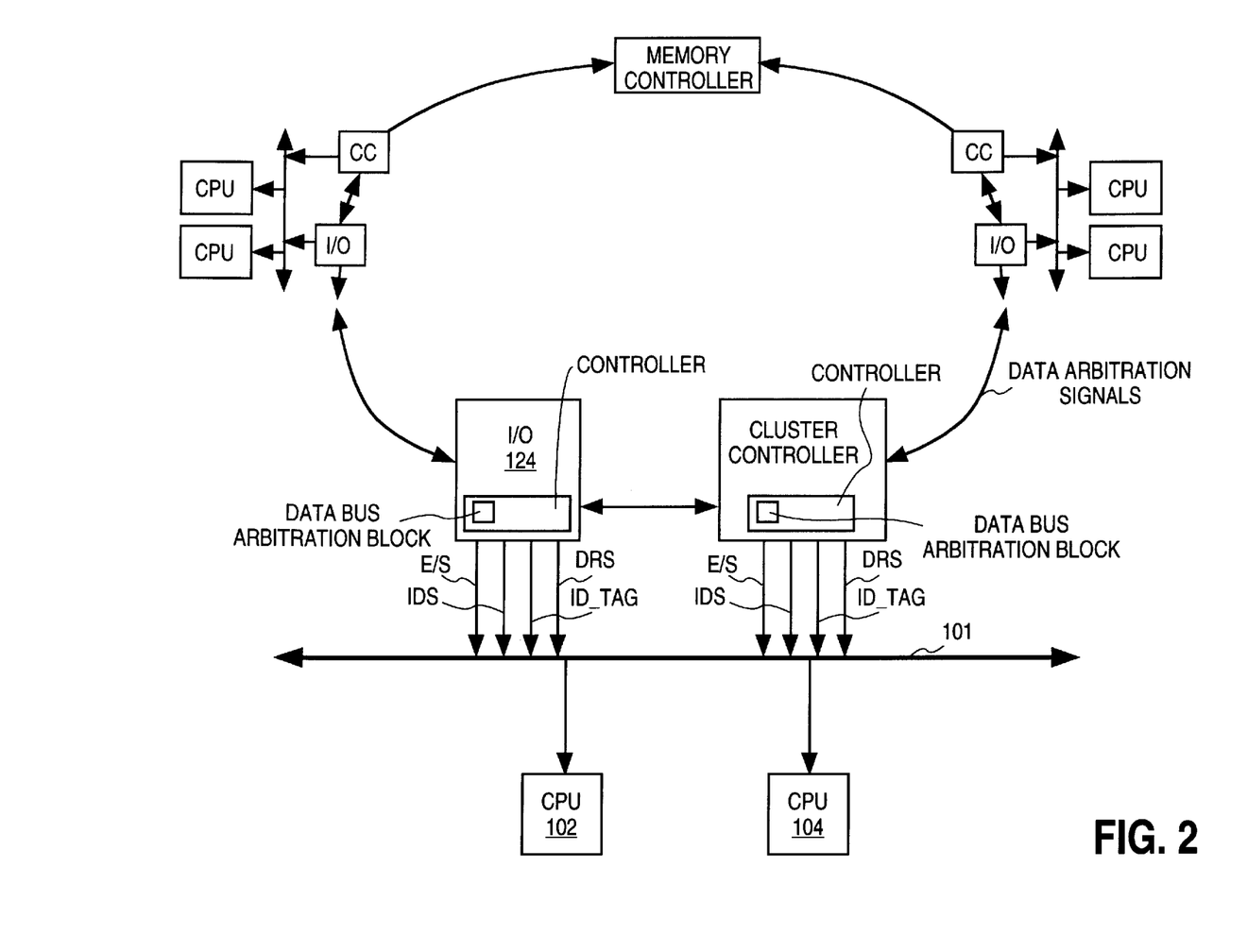
FIG. 2 is a block diagram of one embodiment of the computer system of the present invention.

Referring first to FIG. 2, an overview of one embodiment of the computer system of the present invention is shown in block diagram form. It will be understood that while FIG. 2 is useful for providing an overall description of the computer system of the present invention, a number of details of the system are not shown. As necessary for disclosure of the present invention, further detail is set forth with reference to the other figures provided with this specification.

As illustrated in FIG. 2, in this embodiment, the computer system generally comprises of a processor-system bus or other communication means 101 for communicating information and processors 102 and 104 coupled with processor-system bus 101 for processing information. In the present invention, processor-system bus 101 includes subsidiary address, data and control buses. Processors 102 and 104 include an internal cache memory, commonly referred to as a level one (L1) cache memory for temporarily storing data and instructions on-chip. A level two (L2) cache memory may be coupled to either or both processors 102 and 104 for temporarily storing data and instructions for use by processor 102. In one embodiment, the L2 cache memory is included in the same chip package as processor 102 and/or processor 104.

A level three (L3) cache memory for temporarily storing data and instructions for use by other devices in the computer system (e.g., processor 102, etc.) and a L3 cache controller for controlling access to the L3 cache memory may also coupled to processor-system bus 101.

A cluster controller 122 is coupled with processor-system bus 101 for controlling access to a random access memory (RAM) or other dynamic storage device, commonly referred to as a main memory for storing information and instructions for processors 102 and 104. These memories are well-known in the art and have not been shown to avoid obscuring the present invention.

An input/output (I/O) bridge 124 is also coupled to processor-system bus 101 to provide a communication path or gateway for devices on either processor-system bus 101 or the remainder of the system to access or transfer data between devices or other clusters on the other bus. I/O bridge 124 performs functions such as turning the byte/word/double-word data transfer traffic from I/O bus into line size traffic on processor-system bus 101.

I/O buses may be included to communicate information between devices in the computer system. Such buses, including their interconnection to components in the system, are well-known in the art. Devices that may be (optionally) coupled to these buses in the system include a display device, such as a cathode ray tube, liquid crystal display, etc., for displaying information to the computer user, an alphanumeric input device including alphanumeric and other keys, etc., for communicating information and command selections to other devices in the computer system (e.g., processor 102) and a cursor control device for controlling cursor movement. Moreover, a hard copy device, such as a plotter or printer, for providing a visual representation of the computer images and a mass storage device, such as a magnetic disk and disk drive, for storing information and instructions may also be coupled to I/O bus 131. These have not been shown to avoid obscuring the present invention.

The I/O bridge 124, cluster controller 132, processors 102 and 104 and the processor system bus 101 form a cluster. As shown, the computer system comprises multiple clusters. However, a system may only have one cluster, and the one or more clusters may include one or more processors. Each of the clusters, as well as each of the individual devices in the computer system, may be coupled by one or more buses. In one embodiment, each of the devices in the computer system is coupled to a network, mesh, monolithic interconnect (e.g., fabric), etc., which allows the devices to communicate. In one embodiment, this interconnection allows the devices to be approximately equal distance from each other.

Cluster controller 122 and I/O bridge 130 in each cluster are coupled to the I/O bus via address, data and control buses. Only pertinent portions of these buses have been shown to avoid obscuring the present invention. Each I/O bridge and cluster controller may comprise controllers such as bus controllers to support the split transaction of the present invention. Each of the I/O bridge and cluster controllers may also include a data bus arbitration block to perform data bus arbitration to gain access to the data bus when performing a response or a deferred reply according to the present invention. Such arbitration is well-known in the art. FIG. 1 illustrates the data arbitration signals between each of the I/O bridges and cluster controllers as well as the memory controller 140. These signals permit for data bus arbitration to be handled between the individual devices. In an alternative embodiment, a single data bus arbitration unit may be included in the system to accommodate all data bus arbitration for individual clusters. Note that allowing individual devices to support arbitration among themselves allows a bus protocol to be independent of the individual devices that are utilizing the deferred transactions of the present invention.

The cluster controller 122 and the I/O bridge 130 include, in part, the following pins:

DRS[1:0]#—Defer reply response used as the response status signals of when defer reply occurs. In one embodiment, the bus has a 2-bit encoding for 3 states: wait, retry, normal completion, and hardfailure. In one embodiment, "00" indicates that the device is not to generate out of order replys because the system cannot support them.

ID_tag#[7:0]—This tag (token) bus contains the transaction ID and the requesting agent ID that was sent to the cluster controller by the processor (or other requesting agent) that issued the request along with the address bus. In one embodiment, this bus only carries valid information if the DRS [1:0]# signals change state (when the defer reply is happening in the split transaction). In one embodiment, a separate signal may be used to indicate that this token bus contains valid information (i.e., indicates the DRS [1:0]# signals have changed state). Such a signal may be the IDS# signal shown in FIG. 1.

E/S—The cluster controller indicates the state change for the cross-cluster snoop. In one embodiment, the E/S signal being high indicates an exclusive state, while the E/S signal being low indicates a shared state.

Using these signals, the controller is able to request an out-of-order defer reply through the DRS and the reply directly enters into the response phase of a transaction while arbitrating only for the data bus (not the address bus). That is, the controller is able to send the data onto the data bus without going through the arbitration, request, error, and snoop phases that are used when performing a bus transaction. Although there is arbitration for the data bus, such arbitration may be inherent by the nature of the pipelined bus. That is, because the bus is pipelined, multiple transactions are pending on the bus at the same time. In one embodiment, the processor acts as a slave device in that the decision of whether data may be transmitted to or from the processor under the control of the cluster controller or I/O bridge (or other bus master) and not under the control of the processor. In one embodiment, in the case of a read operation, the data is not sent to the processor until a DRDY# signal is asserted by another device on the bus. Similarly for a write transaction, the processor is not allowed to write data onto the bus until a TRDY# signal is asserted by another device on the bus. In both these cases, the DRDY# and TRDY# signals are coupled between the processor and the bus master(s). (Note that each of these signals as inputs to the processors may be shared by multiple devices.) Therefore, the data bus is under the control of the I/O bridges and cluster controllers. Thus, although the arbitration must occur for the data bus, there is no penalty associated with that arbitration because the I/O bridge and cluster controller are already in control of the data bus and know its availability as the data becomes available. Thus, in summary, although the control for the data bus is decided through arbitration, the deferred replys of the present invention may be used by directly going into the response phase and avoiding the typical arbitration, request, error and snoop phases.

Although in one embodiment of the present invention arbitration for the data bus is implicit, the present systems may be applied for use with arbitration is explicit. Furthermore, as discussed above, arbitration to resolve contention between two or more devices seeking control of the data bus is handled between the responding devices themselves, to the exclusion of the processors (i.e., the requesting devices).

Of course, other embodiments of the present invention may not require nor include all of the above components, while other embodiments require or include additional components. For example, the computer system may include an additional processor coupled to the processor-memory bus 101. The additional processor may comprise a parallel processor, such as a processor similar to or the same as processor 102, or may comprise a co-processor, such as a digital signal processor. In such embodiments, processor 102 and the additional processor(s) reside directly on a processor-memory bus 101.

Bus Protocol of the Present Invention

In the present invention, operations are performed on the processor-memory bus according to a bus protocol. The devices and units in the computer system of the present invention represent both requesting agents and responding agents. A requesting agent is a device which is capable of requesting a bus operation that involves receipt of one or more completion signals and, optionally, data from another device. A responding agent is a device which is capable of responding to the request by sending the necessary signals and, optionally, data in response to the request. Responding agents that are able to accommodate split transactions are referred to herein as "smart" responding agents, while responding agents that cannot accommodate split transactions are referred to herein as "dumb" responding agents. Note that in the following description, the terms "agent" and "device" may be used interchangeably.

In the present invention, bus transactions occur on the buses in the computer system in a pipelined manner. That is, multiple bus transactions may be pending at the same time, wherein each is not fully completed. Therefore, when a requesting agent begins a bus transaction, the bus transaction may only be one of a number of bus transactions currently pending. Although bus transactions are pipelined, the bus transactions in the present invention do not have to be fully completed in order. The present invention allows for some of the completion replies to requests to be out-of-order by supporting deferred transactions. These are referred to as split transactions. Non-split transactions are completed in order.

The present invention accommodates deferred transactions by essentially splitting a bus operation into two independent bus transactions. The first bus transaction involves a request (for data or completion signals) by a requesting agent, and a response by the responding agent (or another agent). The request may include sending an address on the address bus. The request may also include the sending of a token, which the requesting agent uses to identify its request. The response may include the sending of completion signals (and possibly data) if the responding agent is ready to respond. In this case, the bus transaction ends, as well as the bus operation. However, if the responding agent is not ready to respond to the request (e.g., the completion signals and/or the optional data are not ready), the response may include providing an indication to the requesting agent that its response to the request will be deferred. This indication will be referred to herein as a deferral response.

In case of a deferral response, the bus operation comprises a second transaction that includes the responding agent sending a deferred reply with the completion signals and requested data (if any) to the requesting agent, such that the requesting agent completes the transaction. However, in the case of read operations, this second transaction differs from the first transaction because it only has a response phase. That is, the second transaction does not have an arbitration phase, a request phase, a error phase or a snoop phase as discussed above. The data is driven onto the data bus immediately after the responding agent is granted the use of the data bus, independent of the address bus or any other part of the request bus.

In one embodiment, the deferred reply includes completion signals (and possibly data) and comparison of request identifying information. The request identifying information comprises the token. That is, the token is resent by the responding agent to the requesting agent so that the requesting agent can associate the deferred reply with the original request. Deferred and non-deferred bus transactions according to one embodiment of the present invention are depicted in the flow chart of FIG. 3.

Figure 3:
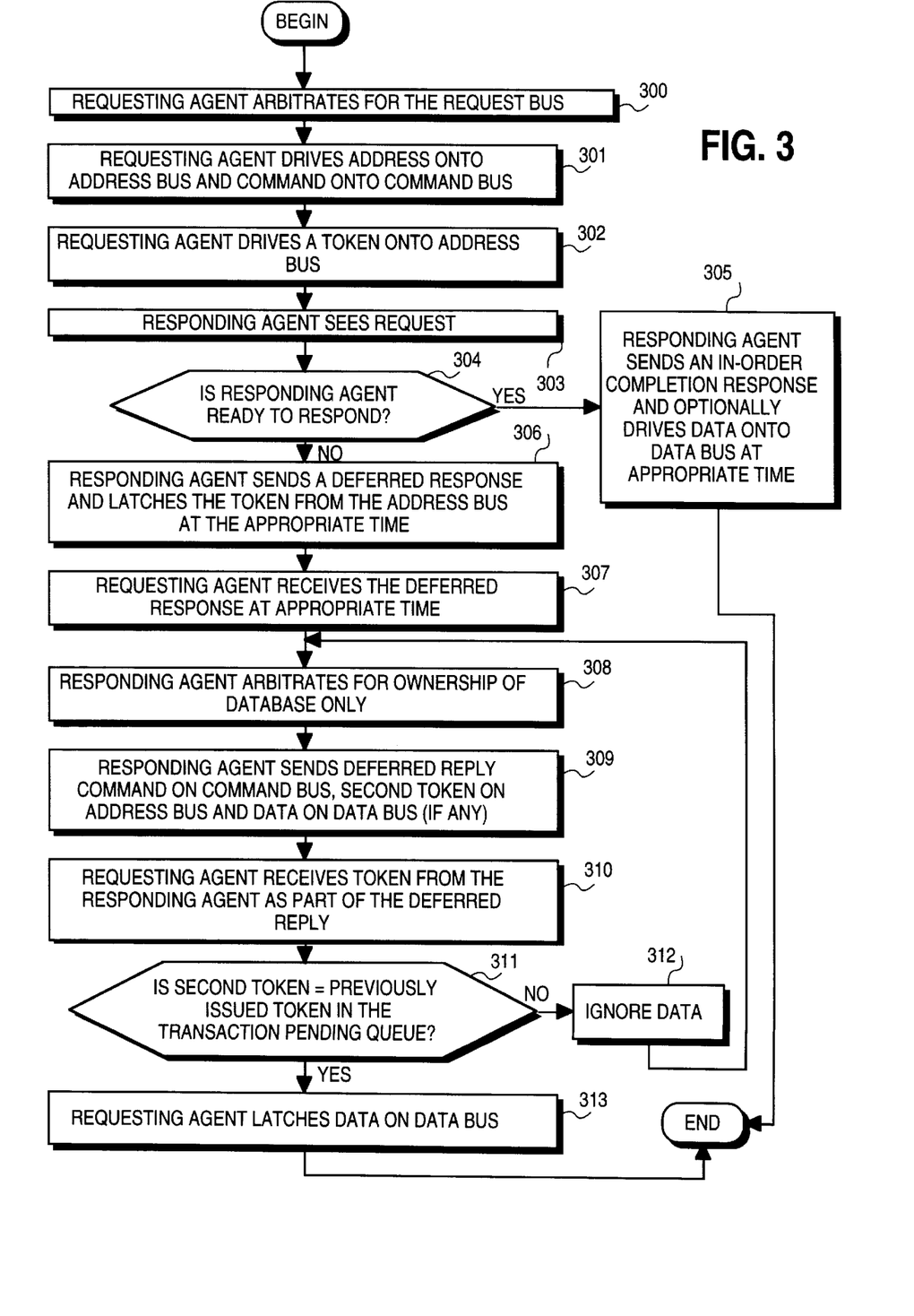
FIG. 3 is a flow diagram of a bus cycle according to the present invention.

Referring to FIG. 3, a bus transaction, deferred or non-deferred, begins when a requesting agent arbitrates for ownership of the address and control bus as used to make requests (processing block 300). Note that the control bus is used, in part, for the purposes of specifying commands, including those commands defining each bus transaction. In the present invention, the requesting agent arbitrates for the address bus and drives addresses and control signals to be used to specify a command. Upon winning the arbitration, the requesting agent drives a request in the form of an address onto the address bus (processing block 301) and the requisite control signals in a manner well-known in the art, and a first token onto the address bus (processing block 302). In one embodiment, the address and the first token are driven on the bus in two consecutive clocks. The token is stored in a queue, referred to as a pending request queue, with an indication of the request with which it is associated.

Once a request has been placed onto the bus, a determination of which device is to be the responding agent occurs (processing block 303). This determination includes a responding agent recognizing the address that was driven onto the address bus. In one embodiment, the responding agent is the device which is mapped into the address space that includes the address of the request.

The responding agent then determines if it is ready to respond (processing block 304). In case of a read operation, the responding agent is ready to respond if the data requested is available. In case of a write operation, the responding agent is ready to respond if it begins completing the write operation upon receipt, or, if capable of a post write, the responding agent is ready to respond as soon as the data and address are received (where the actual writing of the data is finished later). If the responding agent is ready to respond, then the responding device sends an "in-order" completion response indication and drives the necessary signals or data on the data bus at the appropriate time (processing block 205), thereby ending the bus transaction, and the bus operation as non-deferred.

If the responding agent is not ready to complete the bus transaction, then the responding agent latches the first token from the address bus and sends a deferral response at its appropriate response time (processing block 306). The responding agent may not be ready to respond if the data is not ready by the time the responding agent is required to respond in case of a read operation. The responding agent may not be ready to respond until a write operation has been completely finished, such as in the case of a write to an I/O device.

The requesting agent receives the deferral response on the bus at the appropriate time (processing block 307). The appropriate time is dictated by the pipelined nature of the system bus, which will be described in more detail below.

A number of additional bus transactions may be run on the bus after the requesting agent receives the deferral response before the responding agent is finally able to satisfy the request.

When the responding agent is ready to complete the deferred bus operation (e.g., the data does become available to the responding agent), the responding unit arbitrates for use of the data bus only (processing block 308), and the responding agent sends a deferred reply (processing block 309). Such arbitration would be well-known to one skilled in the art. As part of the deferred reply, the responding agent sends a second token on the token bus, a deferred reply signal (e.g., command) on the control bus and any appropriate data on the data bus. In one embodiment, the second token is the same as the first token; however, in other embodiments, the first and second tokens may not be the same, yet have a unique relationship to allow agents to correctly associate one with the other.

The requesting agent monitors the token bus, along with other agents, and receives the token (processing block 310). The requesting agent latches the second token. The requesting agent then determines whether the second token sent from the responding agent matches one of the outstanding tokens in its pending request queue (processing block 311). In such a case, the requesting agent performs a token match between the second token sent from the responding agent and the first token, or any other token stored in the requesting agent. It should be noted that in the present invention, the requesting agent is always monitoring the token bus for tokens.

If the requesting agent determines that second token from the responding agent does not match the first token, then the data on the data bus and the completion signal(s) are ignored (processing block 312). Note that in one embodiment, the first and second tokens are the same. If the requesting agent determines that second token from the responding agent matches the first token, then the deferred reply data on the data bus and/or the completion signals is the data or completion signals originally requested by the requesting agent and the requesting agent receives the completion signals and/or latches the data on the data bus (processing block 313), thus completing the second bus transaction. After receiving the completion signals and/or data corresponding to the original request, the entire bus operation ends. Thus, the bus transaction occurs between the responding agent and the requesting agent and the original bus operation is completed.

After a device has been determined to be the responding agent, the responding agent is responsible for generating a response to ensure that bus retains its pipelined nature. A responding agent may not be able to complete the requested bus transaction at the appropriate times. For example, the data requested may not be available. The data may not be available for numerous reasons. For example, the data may not be available due to long access times of a particular device. Also, the preparation of a response to satisfy the request may require a large number of cycles to complete due to the structure or the nature of a particular device.

Therefore, in the event that the responding agent cannot complete the requested bus transaction at the appropriate times, the responding agent sends a deferral response. This may be done using the RS[1:0] signals. Thus, the responding agent sends either the requested data or completion signals (if ready to respond) or a deferred completion indication comprising a deferral response (if unable to supply the requested completion signals or the requested data) at the appropriate time.

The appropriate time for a responding agent to generate a response is defined as that time at which the responding agent must respond with some type of response in order to retain the order of the responses on the data bus with those requests that occurred on the address bus, thereby ensuring the pipelined nature of the bus of the present invention. In other words, the order of the "responses" on the data bus must occur in the same order as the "requests" on the address bus. Therefore, some type of response to a particular request must appear on the data bus after the response of the request which immediately preceded the particular request on the address bus. If some type of response is not possible in a reasonable time (e.g., ten bus clocks), then all of the subsequent responses will be stalled by the agents responsible for generating them, hurting system performance. Note that the response itself may also be stalled.

To accommodate multiple pending requests that require deferred replies, the responding agent upon completing the bus cycle with a deferral response must be capable of designating the deferred reply with a particular request if the responding agent is to be able to accommodate multiple requests while one or more requests are pending. For example, when data is requested from the cache memory (e.g., L3 cache memory) and the cache controller sends a deferral response, if the cache memory is to be accessed while this request is pending, the responding agent (e.g., the cache controller) must include a mechanism to associate the data that becomes available to the request which requested it. In one embodiment, in processing block 306 the responding agents store deferred requests (and associated tokens) for which a deferral response is generated. When the data is available, the responding agent is able to identify the destination of the data using the stored token and deferred request. The responding agent is responsible for maintaining consistency when it provides a deferral response, such as when there are multiple requests to the same cache line.

The token latched by the responding agent is used as a future reference between the requesting or responding agent to identify the response to the requesting agent when made by the responding agent. The requesting agent using the token stored in the transaction pending queue (with an indication of the request with which it was associated) watches for the response to the request. When the responding agent is ready to complete the bus transaction, the same token (used when sending the request) is sent on the address bus. In one embodiment, a special command is used to indicate to agents on the bus that the token bus has a valid token and the data on the data bus is associated with the token. Associated with the special command (e.g., control signal(s)) is the data (on the data bus) that was originally requested, if any, by the requesting agent. In this manner, the subsequently sent token reestablishes contact with the requesting agent.

Deferred Operations

During the Request Phase of a bus transaction, an agent may assert a Defer Enable (DEN#) signal to indicate if the transaction can be given a deferred response. Note that the "#" symbol indicates that the signal is active low. When the DEN# signal is deasserted, the transaction must not receive a deferred response. In one embodiment, all transactions in a bus-locked operation, deferred reply transactions, and writeback transactions cannot be deferred. Transaction-latency sensitive agents can also use the DEN# signal feature to guarantee transaction completion within a restricted latency.

A DEFER# signal in conjunction with a HITM# signal are used to determine when a response is to be deferred. The HITM# signal, when asserted, indicates the presence of modified data in the cache. In-order completion of a transaction is indicated by the DEFER# signal being deasserted or the HITM# signal being asserted during the Snoop Phase, followed by normal completion or implicit writeback response in the Response Phase. When the Defer Enable (DEN#) signal is inactive (and the HITM# signal deasserted), the transaction can be completed in-order or it can be retried, but not deferred. Thus, any bus agent incapable of supporting a deferred response may use this to be compatible, requiring that the transaction be completed in-order as described above or retried. A transaction can be retried when the DEFER# signal is asserted and the HITM# signal is non-asserted during the Snoop Phase followed by a retry response during the Response Phase. That is, a bus agent incapable of supporting a deferred response will provide a retry response if unable to provide the required response at the time of the Response Phase.

When Defer Enable (DEN#) is asserted, the transaction can be completed in-order, can be retried, or deferred. When a transaction is to receive a deferred reply, the DEFER# signal is asserted (while the HITM# signal is deasserted) during the Snoop Phase followed by a deferral response in the Response Phase.

It is the responsibility of the agent addressed by the transaction to assert the DEFER# signal. In another embodiment, the responsibility can be given to a third party agent who can assert the DEFER# signal on behalf of the addressed agent.

In the present invention, a requesting agent assumes that every outstanding transaction issued with an asserted Defer Enable (DEN#) signal in the Request Phase may be completed with a deferred reply. To account for the possibility that each issued transaction may receive a deferred response, the requesting agent maintains an internal outstanding transaction queue, referred to herein as the pending request queue. Each entry in the queue has an ID. The number of queue entries (and the number of IDs) is equal to the number of requests the agent is able to issue and have pending. During the deferred reply of the second transaction, the requesting agent compares the reply sent on the address bus with all deferred IDs in its pending request queue. On an ID match, the requesting agent can retire the original transaction from its queue and complete the operation.

If a responding agent is unable to guarantee in-order completion of a transaction, the responding agent asserts a DEFER# signal in the transaction's Snoop Phase to indicate that the transaction is to receive a deferred reply or is to be aborted. If the DEFER# signal is not overridden by another caching agent asserting the HITM# signal (indicating a hit to a modified line in the cache) in the Snoop Phase, then the responding agent owns the transaction response. The response of the responding agent is determined by its reply policy. If the responding agent is capable of and desires completing the request in a subsequent independent bus transaction, then it generates a deferral response.

After issuing a deferral response and once ready to respond, the responding agent issues a second independent bus transaction to complete the earlier request for which the response was deferred. This second transaction may return data to complete an earlier transaction (e.g., in case of a read operation), or it may simply indicate the completion of an earlier transaction (e.g., in case of a write operation).

Figure 4:
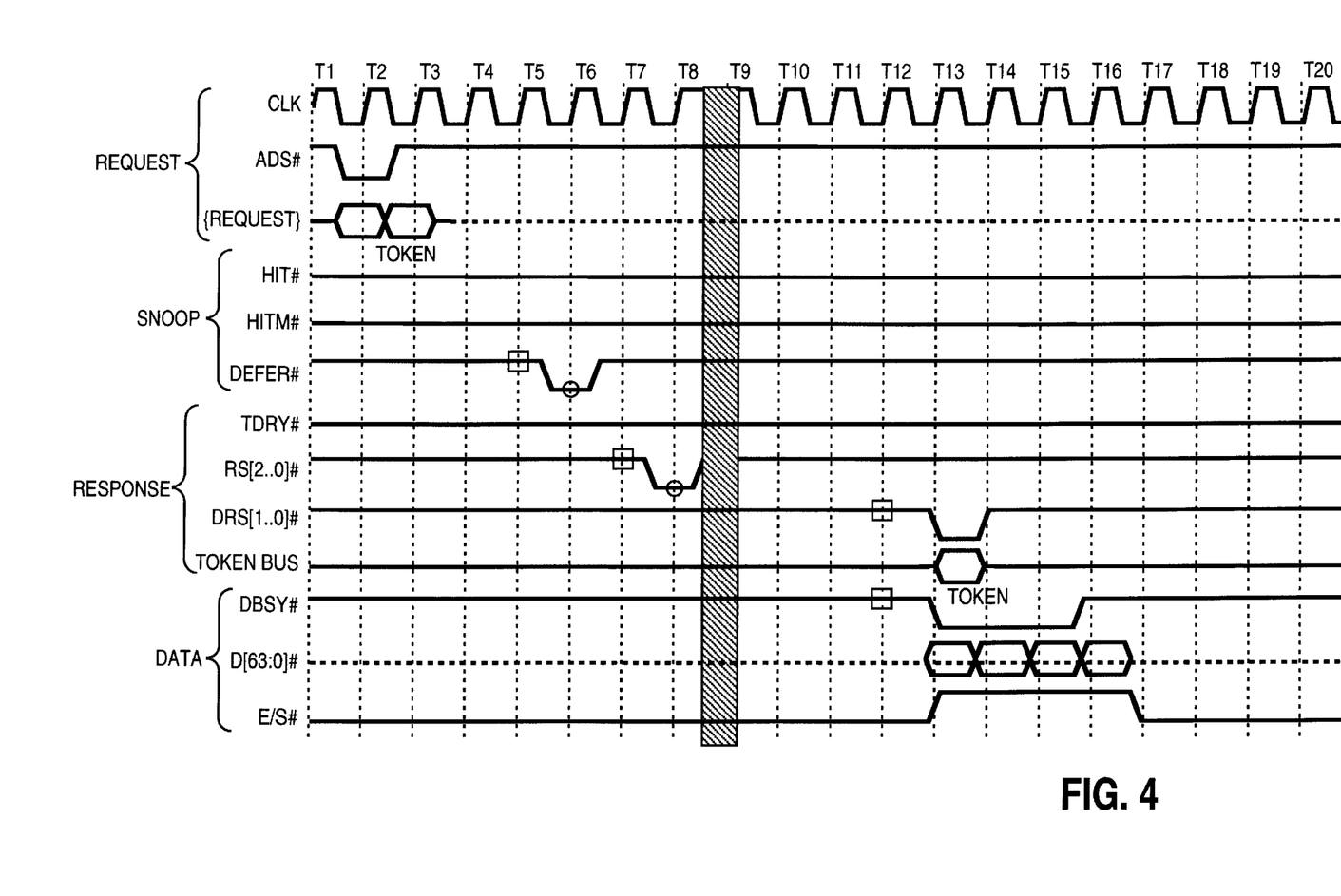
FIG. 4 is a timing diagram of depicting a deferred response according to the present invention.

FIG. 4 illustrates a deferral response followed by the corresponding deferred response to a read operation with a deferred read out-of-order reply. Referring to FIG. 4, in T1, the requesting agent asserts the ADS# signal indicating that a valid bus definition and address is on the control and address buses. Also in T1, the requesting agent drives the {REQUEST} group to issue a Read Line request. In T2, the requesting agent drives the token into the address bus. The address and token are latched by the addressed agent in T2 and T3 respectively.

In the Snoop Phase, the addressed agent determines that the transaction cannot be completed in-order and hence asserts the DEFER# signal in T5. In T7, the addressed agent becomes the responding agent due to deasserted state of the HITM# signal in T6. The responding agent returns a deferral response in T7 by asserting the proper encoding on the RS[2:0]# signals. The RS[2:0]# signals are used to encode different types of responses, including a deferral response. Note that the responding agent stores the token latched from the address bus.

Prior to T12, the addressed responding agent obtains the data required in the original request. In T12, the responding agent issues a second transaction, by placing the token from the original transaction on the token bus and using the DRS[2:0]# signals which indicate that the response is a deferred out-of-order replay. The requesting agent picks up snoop responsibility.

Also in T12, the responding agent drives normal completion response and begins the Data Phase, if necessary. The responding agent returns a successful completion response with data on the bus and drives data during T12–T15, which is received during T13–T16.

Note that in T13, the requesting agent observes the second transaction. The requesting agent compares the token received from the token bus with the token corresponding to the original request. In T16, the requesting agent receives the deferred reply and removes the transaction from its pending request queue (and the In-Order queue). This completes the bus operation.

In one embodiment, a memory agent or I/O agent in the computer system may defer a response on any request other than a bus locked request, another deferred reply transaction, or a cache line write designated for explicit writeback.

In the present invention, the deferred reply "wakes" up the original transaction. That is, the original transaction carries on and completes as if the requesting agent had initiated the transaction. For instance, when a memory agent returns a deferred reply to a processor in the system, the memory controller is not the master, and the processor acts as if it had initiated the transaction, responding to the handshaking on the bus.

Receiving a deferred reply removes the transaction from the In-Order queue. In order to complete the original request, the responding agent initiates a second independent transaction on the bus. The token (e.g., deferred reply ID), latched during the original transaction, is used as the address in the Request Phase of the second transaction.

Figure 5:
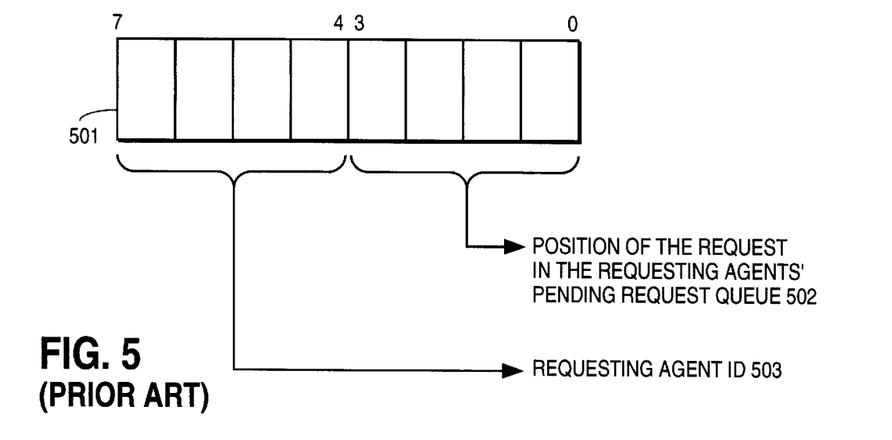
FIG. 5 illustrates an 8-bit token of the present invention.

In one embodiment, a token (e.g., deferred ID) contains eight bits, ID[7:0]#, divided into two four-bit fields. An exemplary token is shown in FIG. 5. The token is transferred on the ID bus (carrying ID[7:0]#) in the second clock of the original transaction's Request Phase. ID bus lines [7:4] contain the response agent ID (e.g., CPU ID), which is unique for every responding agent. ID bus lines [3:0] contain a request ID, assigned by the request agent based on its internal queue. An agent that supports more than sixteen outstanding deferred requests can use multiple agent IDs. In one embodiment, only four outstanding deferred requests may be supported by the processor of the computer system.

Figure 6:
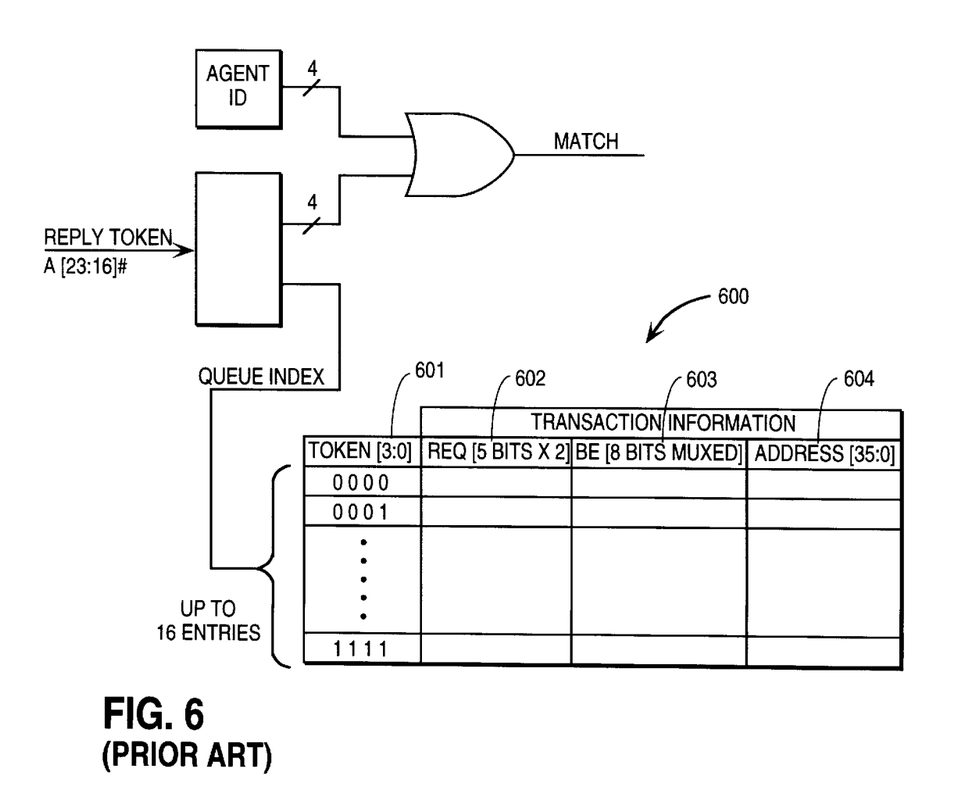
FIG. 6 illustrates one embodiment of the transaction pending queue in the receiving agent.

To complete the transaction, the ID bus is used to return the token, which was sent with the request on ID[7:0]#. During the Response Phase, the deferred reply is driven along with any data during the Data Phase. The requesting agent decodes the token returned on the token bus and compares it with previously deferred requests. The requesting agent compares the agent ID with its agent ID to see if there is a match. In case of a match, the requesting agent uses the remainder of the token as an index to point to the proper entry in its pending request queue. (Exemplary matching hardware is shown in FIG. 6.)

Responding Agent Embodiments

In the present invention, some responding agents never defer requests, some responding agents always defer requests, and some responding agents defer requests for certain operations and not other operations.

In the above illustrated embodiments, one agent may be the memory agent or I/O agent in a deferred operation.

If a caching memory controller, such as L3 cache controller 110, is in the computer system, the cache controller may also generate the deferred responses on read operations when the read data is not immediately available in the cache memory. The L3 cache controller will then proceed to obtain the data from the memory, such as main memory 121, while servicing any subsequent requests for data available in the L3 cache memory. When the read response is ready, the L3 cache controller arbitrates for the bus and returns the read data.

If an I/O bridge is in the computer system, the I/O bridge may defer bus transactions. It should be noted that this is typically performed according to an I/O bus standard, such as the PCI, EISA, ISA, MCA, PCMCIA, VESA standard. Generally, accesses to devices residing on the I/O bus take longer to complete than accesses issued to the memory devices. In a highly pipelined bus involving requests generated from multiple requesting agents, there is an intermix of I/O operations and memory operations. In order to eliminate the stalling effect of I/O accesses in subsequent memory accesses, the I/O bridge of the present invention may generate a deferred response to accesses directed towards itself (and the devices on the I/O bus). In one embodiment, the I/O bridge of the present invention has the hardware necessary for deferring multiple bus requests. When the response is ready, the I/O bridge arbitrates for the bus and initiates a deferred reply (a second independent transaction).

Token Generation and Recognition Hardware

The bus architecture enables pipelined communication transactions wherein the differing bus phases of the pipelined transactions overlap. For one embodiment, the bus is configured to support up to eight outstanding communication transactions simultaneously. In one mode, each processor can issue up to four outstanding communication transactions on the bus. The pipelined communication transactions receive responses and data over the bus in the same order as the communication transactions are initiated on the bus.

Each bus agent coupled to the bus maintains internally a set of bus transaction queues that maintain transaction information in order to track the communication transactions. The transaction information includes the number of transactions outstanding, an identifier for the next transaction to receive a response, and a flag indicating the transactions issued by that bus agent.

Each bus agent coupled to the bus logs the bus transaction information for all transactions in an internal queue referred to as the in-order queue (IOQ).

All bus agents coupled to the bus maintain identical in-order queue status for tracking the communication transactions issued on the bus. Each communication transaction including deferred transactions issued on the bus is entered into the in-order queue of each bus agent coupled to the bus. For each bus agent, the communication transaction at the top of the in-order queue is the next transaction to enter the response and data phases.

In the present invention, each of the requesting and responding agents supports additional functionality in order to utilize the deferred protocol. In the present invention, the agents capable of deferral and deferred responses function as a bus master. Being a bus master according to the present invention comprises the ability to arbitrate for the bus and carry out a request transfer cycle. In the case of read transactions, these bus masters only arbitrate for the data bus. This allows the response agent to initiate the second transaction and to obtain control of the bus when completion signals or data is ready subsequent to the responding agent providing a deferral response. For instance, the processors are bus masters generally. On the other hand, memory controllers generally are not bus masters and, thus, would need to have this ability to initiate the later transactions to complete the bus operation.

In the illustrated embodiment, token generation is the responsibility of the requesting agent. One embodiment of a token of the present invention is shown in FIG. 5. Referring to FIG. 5, token 501 is comprised of eight bits divided between two components: a position ID 502 indicating the position of the deferred request in the internal pending request queue of the requesting agent and a requesting agent ID 503 indicating the source of the token. (The pending request queue will be described in more detail below). The requesting agent ID 503 is comprised of four bits. The requesting agent ID 503 may be comprised of more or less than four bits. For instance, the requesting agent ID 503 may be a 3-bit ID. The number of bits used to represent the ID of the requesting agent indicates the maximum number of requesting agents in the computer system that may accommodate deferred responses. For example, by using four bits for the ID, sixteen requesting agents that generate deferrable requests may exist on the bus.

As shown in FIG. 5, the number of bits used to indicate the position of the request in the pending request queue of the requesting agent comprises of four bits. The position of the request may be described using more or less than four bits. For instance, the request position may be a 2-bit number. The number of bits used to describe the position of the request indicates the size of the request queue. For example, using four bits for the position request indicates that the request queue is capable of having a maximum of 16 separately addressable entries.

A responding agent that is capable of deferred responses maintains an internal deferred request queue for storing tokens latched from the address bus when providing a deferral response. In one embodiment, this queue contains 16 entries, but may have more or less (e.g., 2–32 entries). In the present invention, only a small queue depth is sufficient since the comparison hardware need support only the entries that are actually deferred.

One embodiment of a request queue in a responding agent is shown in FIG. 6. Referring to FIG. 6, request queue 600 is shown having multiple entries, wherein each entry includes multiple fields. In one embodiment, queue 600 is a 16 entry queue. In the present invention, each entry row has a token field 601, a request field (REQ) 602, a byte enable (BE) field 603 and an address field 604. REQ field 602, BE field 603 and address field 604 represent the transaction information corresponding to each token in token field 601 in queue 600. REQ field 602 uses two request fields to store the type of request. BE field 603 stores the byte enable information that is used in further qualifying the request. Address field 604 stores the address.

In one embodiment, token field 601 comprises four bits and represents an index, REQ field 602 comprises 5 bits×2, BE field 603 comprises eight bits muxed, and address field 604 comprises 36 bits. The token field 601 may be implicit in the hardware and, hence, may not be physically implemented in the hardware. In one embodiment, the token field 601 is not implemented in hardware when the position of the entry in the queue is the same as the token field contents. Note also that the index of the token field may be a randomly generated value.

Also shown in FIG. 6 is comparison logic which receives four bits of the token (from a latch, for instance) representing the agent ID and compares them to the agent's ID to see if there is a match. In case of a match, the representing agent uses the other four bits as an index into the queue.

At the time the responding agent wishes to provide a deferral response, the responding agent assigns an entry for the transaction in the deferred request queue for storing the token latched from the address bus. The assigned entry in the queue of the responding agent stores the token and the REQ, BE, and Address fields. After the transaction is complete, the responding agent becomes a request bus owner and initiates a second bus transaction to provide a deferred reply. The responding agent also reclaims free queue entries in the deferred request queue.

The requesting agents of the present invention include logic for managing the request pending queue and for token generation. Based on the above description, this logic is well within the ability of those skilled in the art, and thus, will not be described further. The responding agents also have logic for managing their queues. Preferably, the responding agent is able to take appropriate action on the new request of the bus while the deferred requests are being processed. The responding agent is further provided with the capability to compare the address of the new request against the contents of an entry in the deferred request queue. In one embodiment, each agent includes a latch and a comparator to compare the new request to entries stored in the deferred request queue of the responding agent. The size of the comparators may be reduced, such that only the lower bits in the address are compared. On a positive match, the responding agent may abort the new request to avoid any conflict with an already deferred request.

In the present invention, the requesting agents are capable of accepting and comprehending the deferred responses (e.g., the deferral response and the deferred reply). In the present invention, the requesting agents are also capable of taking the appropriate action(s) in response to these responses. One action may involve temporarily suspending a request.

Figure 7:
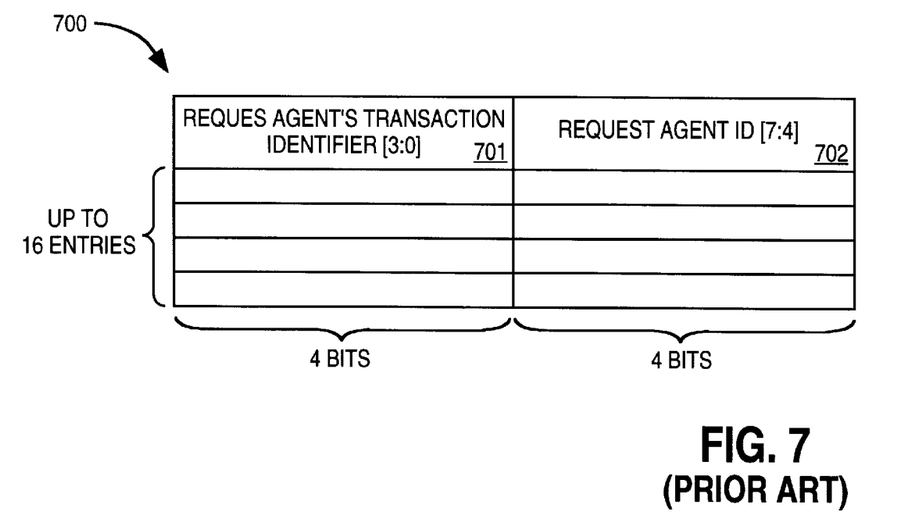
FIG. 7 illustrates one embodiment of the transaction pending queue requesting agent.

In one embodiment, the requesting agents assumes that every outstanding transaction issued in the Request Phase may receive a deferral response. Each requesting agent includes a queue to temporarily store deferred requests (e.g., tokens and their associated requests). Therefore, the requesting agents maintain an internal pending request queue with the same size as its ability to issue new requests. One embodiment of the pending request queue is shown in FIG. 7. Referring to FIG. 7, queue 700 is shown having four entries, where each entry is comprised of 8 bits which include a requesting agent's request identifier field 701 and a field for the requesting agent's ID 702. The requesting agent ID 702 is the same for all entries in a particular requesting agent's queue. The number of bits used to represent the identifiers limits the number of designed entries in queue 700. In one embodiment, the identifier comprises four bits, but may comprise as many bits as necessary to support the total number of entries in queue 700. The agent ID field 702 is comprised of 4-bits for storing the agent's ID. Together the request identifier 701 and agent ID 702 form the token.

On observing a deferral response, the requesting agent maintains a copy of the token provided with the request in the generated token field 702 in outstanding transaction queue 700. The requesting agents also have the ability to release the bus after it received deferral response.

In one embodiment, a separate request pending queue is not required when the bus agent already includes a register file or list of bus operations that are pending. Since the agent ID is common to all queue entries, only a storage area specifying the pending transactions is required. The In-order queue, or other memory storage, that maintains a record of operations for the bus can be used as a pending request queue. Each of the transactions are identified using an index (e.g., 0,1,2,3). In one embodiment, only two bits are used to support index values for four possible pending transactions. A field for one or more bits may be added to the queue and used to indicate whether a request received a deferral response. Therefore, a separate request pending queue is not required. Note that token generation logic would have to obtain an agent's ID from a storage location and combine it with the request identifier (e.g., index into a bus queue) to generate a token.

The requesting agent also includes matching hardware for matching the subsequently returned data or completion signals to the appropriate request using the returned token. During the second independent transaction, the requesting agent matches the resent token with all stored tokens in its pending request queue. On an ID match, the requesting agent can complete the operation and discard the original suspended request from its pending request queue.

Figure 8:
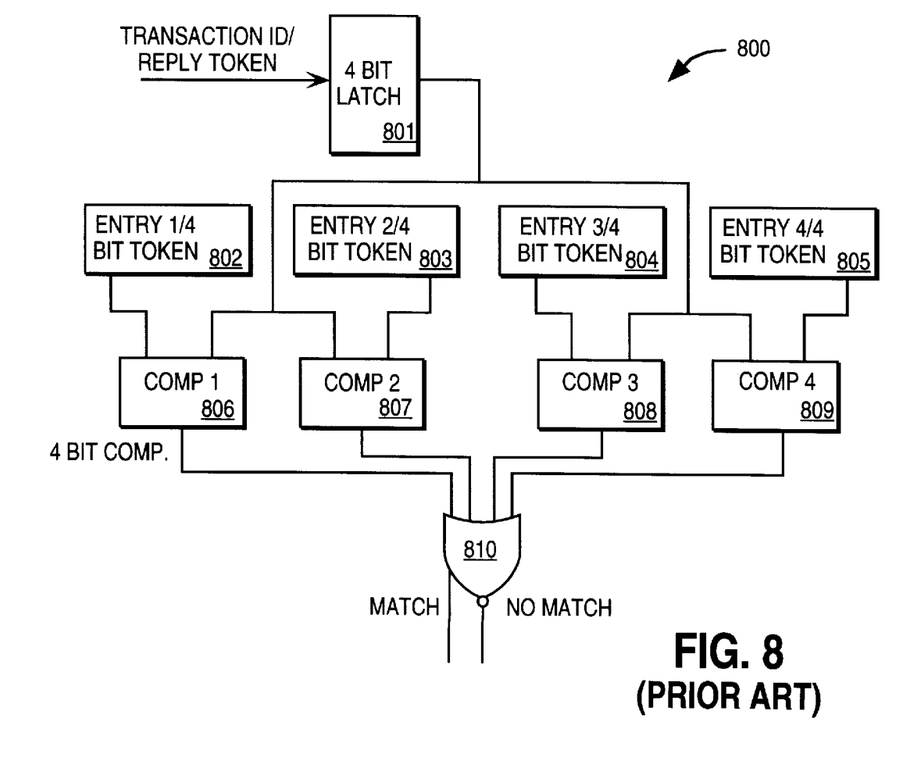
FIG. 8 is a block diagram of one embodiment of the token matching hardware of the requesting agent.

In one embodiment, each requesting agent includes comparator logic to perform the matching. In one embodiment, the comparator logic is comprised of 8-bit comparators for performing the matching and control logic for identifying the match and returning data to internal units with their interval tags. In another embodiment, separate agent ID and transaction ID (e.g., index) matching logic is used. One embodiment of the matching hardware for matching a transaction ID is shown in FIG. 8. Note that agent ID matching logic, such as described in FIG. 6 may be included as well. Referring to FIG. 8, matching hardware 800 comprises latch 801, latches 802–805 for storing the tokens (or a portion thereof) associated with deferred responses, comparators 806–809 for comparing the stored entries with the resent token, and NOR gate logic 810. Latch 801 is coupled to receive four bits of the reply token. The output of latch 801 is coupled to one input of each of comparators 806–809. The other input of each of the comparators 802–809 is coupled to the output of latches 802–805 respectively. The outputs of each of comparators 802–809 are coupled to the inputs of NOR gate logic 810.

In one embodiment, latch 801 comprises a 4-bit latch which receives the transaction ID from the resent token from the address bus. Latch 801 is sized according to the number of bits in the transaction ID of the resent token. Latch 801 supplies the transaction ID to each of comparators 802–809. Each of the tokens stored in the pending request queue of the requesting agent are supplied to the comparators 802–809 via latches 802–805. Latches 802–805 are sized according to the number of bits in the transaction ID of tokens.

After performing an agent ID match, each of comparators 802–809 compares the transaction ID of the resent token to those of the stored tokens. If there is a match to a token stored in the pending request queue, one of comparators 802–809 produces a high output. If there is not a match to a token stored in the pending request queue, none of comparators 802–809 produces a high output. If none of the outputs from comparators 802–809 is high, then the No Match output of NOR gate logic 810 is high, thereby indicating that the resent token does not correspond to a suspended request in the requesting agent. If one output from comparators 802–809 is high, then the match output of NOR gate logic 810 is high, thereby indicating that the resent token corresponds to a suspended request in the requesting agent. In case of a match, the requesting agent "wakes up" and latches the data on the data bus (optional) and receives the completion signals corresponding to the original request.

Note that latches and comparators large enough to accommodate the entire token (e.g., 8-bit comparators, latches)

may be used. However, in view of the fact that the agent ID portion of the resent token is always the same, complexity and cost may be reduced by providing only one agent ID comparison with separate transaction ID comparisons.

If a separate request pending queue is not required (and an existing bus queue is used), the matching logic of the present invention matches the agent ID portion of the resent token with its ID and then uses the remainder of the returned token as an index into the queue.

In an alternative embodiment, the present invention could use the request address as part or all of the token.

Whereas many alterations and modifications of the present invention will no doubt become apparent to a person of ordinary skill in the art after having read the foregoing description, it is to be understood that the particular embodiments shown and described by way of illustration is in no way intended to be considered limiting. Therefore, references to details of various embodiments are not intended to limit the scope of the claims which in themselves recite only those features regarded as essential to the invention.

Thus, a method and apparatus for performing deferred bus transactions in a computer system has been described.

We claim:

1. A computer system comprising:
   a bus operable in a pipelined order and having a response bus, a data bus, an address bus, and a token bus;
   a requesting agent coupled to the bus to generate a bus request; and
   a responding agent coupled to the bus, wherein the responding agent provides a deferral response onto the response bus if not ready to complete the bus operation and thereafter provides an out-of-order deferred reply without using the address bus, the out-of-order deferred reply comprising request identification information on the token bus and data responsive to the request onto the data bus after arbitrating for use of the data bus only when ready to complete the bus operation.

2. The system defined in claim 1 wherein the responding agent provides the out-of-order deferred reply when the data requested by the bus operation is available.

3. The system defined in claim 1 wherein an out-of-order deferred reply indication is provided onto the response bus.

4. The system defined in claim 1 wherein the responding agent provides the deferral response in a response phase of a first bus transaction and provides the out-of-order deferred reply during a response phase of a second bus transaction.

5. The system defined in claim 4 wherein the responding agent initiates the second bus transaction and directly enters the response phase by asserting at least one signal on the response bus.

6. The system defined in claim 1 wherein the responding agent comprises an arbitration mechanism to arbitrate for control of the data bus independent of the address bus.

7. The system defined in claim 1 wherein the bus further comprises a request identification (ID) bus.

8. The system defined in claim 7 wherein the responding agent drives request ID information onto the request ID bus while driving the out-of-order deferred reply on the response bus.

9. The system defined in claim 8 wherein the responding unit provides an out-of-order deferred reply indication on the response bus, the request ID information onto the request ID bus, and the data onto the data bus in a response phase of a bus transaction.

10. A method for performing bus operations in a computer system, the method comprising steps of:
    a first agent initiating a bus operation;
    a second agent providing a deferral response to the first agent in response to the bus operation;
    sending a deferred reply to the first agent without using an address bus including sending data onto a data bus after arbitrating for only the data bus;
    the first agent receiving the deferred reply to complete the bus operation.

11. The method defined in claim 10 wherein the deferral response is sent as part of a first bus transaction and the out-of-order deferred reply is sent as part of a second bus transaction.

12. The method defined in claim 11 wherein second agent enters directly into a response phase of the second bus transaction when providing to out-of-order deferred reply.

13. The method defined in claim 10 further comprising the steps of:
    retrieving data associated with the bus operation;
    the second agent arbitrating for use of a data bus; and
    the second agent sending the data on the data bus upon grant of ownership of the data bus to the second agent.

14. The method defined in claim 13 wherein the step of initiating a bus operation comprises the steps of:
    the first agent driving an address on an address bus; and
    the first agent driving request identification (ID) information on the address bus.

15. The method defined in claim 14 further comprising the step of sending the request ID information to the first agent on an ID bus.

16. A method for performing bus operations in a computer system, the method comprising steps of:
    initiating a bus operation by driving an address on an address bus;
    driving request identification (ID) information on the address bus;
    receiving a response indicating that a deferred reply to the bus operation is to be received;
    receiving the request ID information from an ID bus, data on a data bus and the deferred reply without using the address bus;
    identifying the request ID information as corresponding to the bus operation; and
    receiving the deferred reply to complete the bus operation.

17. The method defined in claim 16 wherein the step of receiving the request ID information and the deferred reply occurs after data associated with the bus operation is retrieved and an agent sending the data and the deferred reply arbitrates for use of a data bus.

18. The method defined in claim 17 further comprising arbitrating for use of the data bus occurs without arbitrating for use of the address bus.

19. The method defined in claim 18 wherein arbitrating for use of a data bus occurs as soon as the data is available.

20. The method defined in claim 16 further comprising the step of comparing the request ID information with a queue of pending transactions in the first agent and identifying the request ID information as corresponding to the bus operation if the request ID information matches one of the pending transactions in the queue.

21. The method defined in claim 16 wherein the request ID information comprises an agent ID.

22. The method defined in claim 21 wherein the agent ID comprises a processor ID.

23. The method defined in claim 16 where in the request ID information comprises a storage location in a queue of pending transactions in the first agent.

24. The method defined in claim 16 wherein the step receiving the response comprises receiving an assertion of a defer signal.

25. The method defined in claim 16 further comprising receiving at least one completion signal to the first agent.

26. The method defined in claim 17 further comprising the step of driving data on a data bus in the computer system as part of the deferred reply.

27. A computer system comprising:

an address bus;

a request identification (ID) bus;

a requesting agent coupled to the address and request ID buses, wherein the requesting agent is operable to generate a bus request to start a first bus transaction by providing an address and request ID information on the address bus;

a responding agent coupled to the address and request ID buses, wherein said responding agent, responsive to the address and the request ID information, provides a response to the requesting agent indicating that a deferred reply is to be made to satisfy the bus request when the responding agent is not ready to complete the bus request, thereby completing the first bus transaction, and further wherein the responding agent drives request ID information on the request ID bus, data on the data bus, and the deferred reply as a second bus transaction independent of the address bus availability and without the address bus when ready to send the data to complete the bus request.

28. The system defined in claim 27 further comprising a data bus coupled to the requesting agent and the responding agent, wherein the responding agent retrieves data responsive to the bus request, arbitrates for use of the data bus, and sends the data on the data bus to the requesting agent as part of the second bus transaction upon grant of ownership of the data bus.

29. The system defined in claim 28 wherein the responding agent arbitrates for use of the data bus without arbitrating for use of the address bus.

30. The system defined in claim 28 wherein the responding agent arbitrates for use of the data bus as soon as the data is available.

31. The system defined in claim 27 wherein the requesting agent identifies the request ID information as corresponding to the bus request and accepts the deferred reply to complete the second transaction.

32. The system defined in claim 27 wherein the request ID bus comprises a uni-directional bus from the requesting agent to the responding agent.

33. The system defined in claim 27 wherein the requesting agent provides the address and the request ID information on the address bus in consecutive clock cycles.

34. The system defined in claim 27 wherein the responding agent is not ready to respond because the data corresponding to the bus request is not available.

35. A method for performing bus transactions in a computer system, the method comprising steps of:

receiving an address and request identification (ID) information on an address bus as part of a request to initiate a first bus transaction;

sending a deferral response in response to the request to complete the first bus transaction;

the second agent sending both the request identification information on an ID bus and a deferred reply as part of a second bus transaction without using the address bus;

the second agent arbitrating for use of a data bus; and the second agent sending the data on the data bus as part of the second bus transaction without using the address bus upon grant of ownership of the data bus to the second agent.

36. The method defined in claim 35 further comprising the steps of:

identifying the deferred reply as corresponding to the request; and receiving the deferred reply to complete the second bus transaction, such that the request is completed in two bus transactions.

37. The method defined in claim 36 wherein the second agent arbitrates for use of a data bus occurs without arbitrating for use of the address bus.

38. The method defined in claim 36 wherein second agent arbitrates for use of a data bus occurs as soon as the data is available.

39. The method defined in claim 35 wherein the step of identifying includes comparing the request ID information with a plurality of pending bus operations in a queue in the first agent, and receiving the deferred reply if the request ID information matches one of the plurality of pending bus operations.

* * * * *

UNITED STATES PATENT AND TRADEMARK OFFICE
CERTIFICATE OF CORRECTION

PATENT NO. : 6,012,118
DATED : January 4, 2000
INVENTOR(S) : Jayakumar et al.

It is certified that error appears in the above-identified patent and that said Letters Patent is hereby corrected as shown below:

In column 18, at line 43, delete "802" and insert --806--.
In column 18, at line 45, delete "802" and insert --806--.
In column 18, at line 49, delete "802" and insert --806--.
In column 18, at line 52, delete "802" and insert --806--.
In column 18, at line 54, delete "802" and insert --806--.
In column 18, at line 55, delete "802" and insert --806--.
In column 18, at line 59, delete "802" and insert --806--.

Signed and Sealed this

Third Day of April, 2001

*Attest:*

NICHOLAS P. GODICI

*Attesting Officer*   Acting Director of the United States Patent and Trademark Office